UNITED STATES PATENT OFFICE.

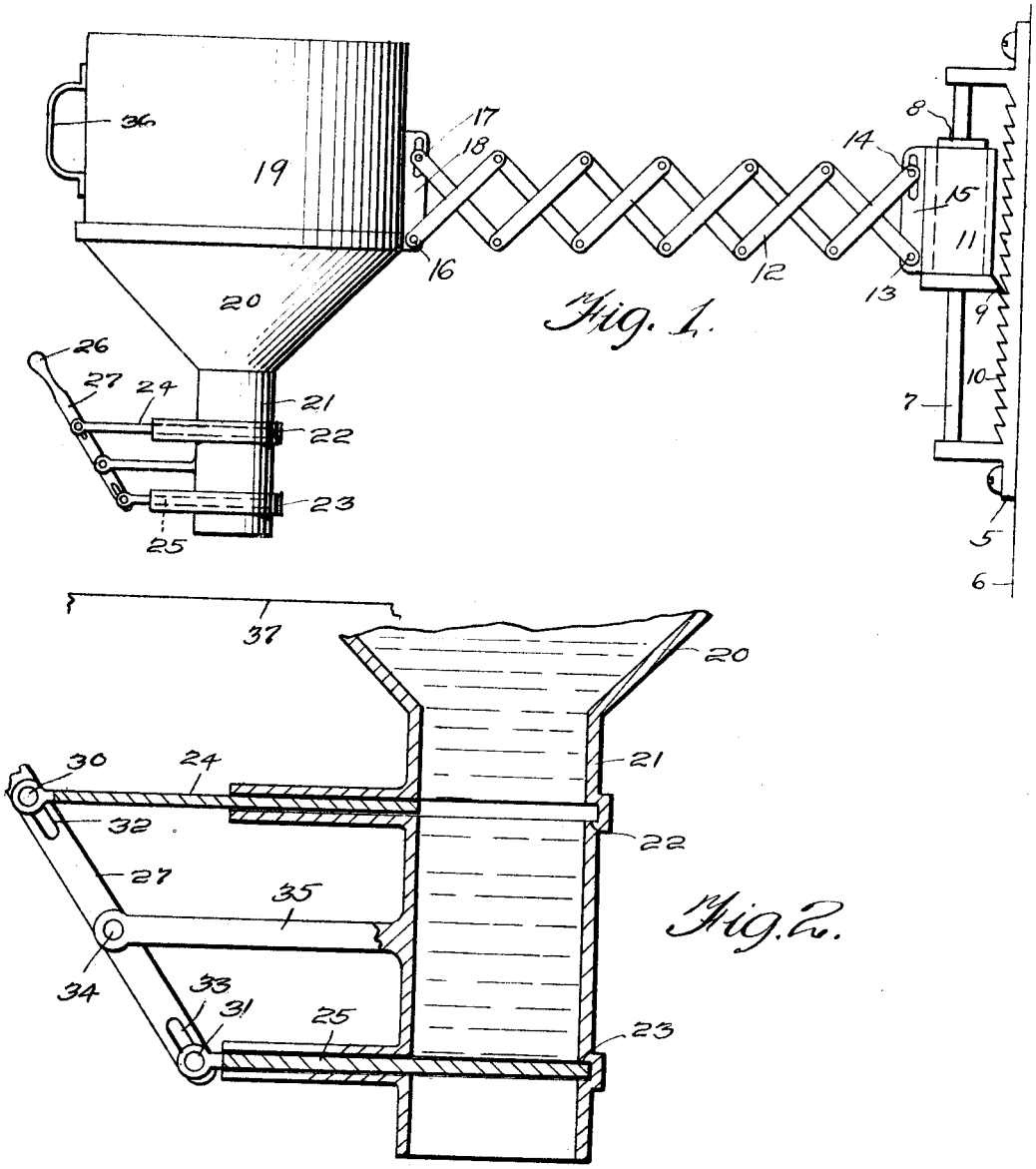

WILLIAM L. HEATHCOTE, OF KANSAS CITY, MISSOURI.

HOT-CAKE MACHINE.

1,378,377. Specification of Letters Patent. Patented May 17, 1921.

Application filed August 27, 1920. Serial No. 406,308.

*To all whom it may concern:*

Be it known that I, WILLIAM L. HEATHCOTE, a citizen of the United States, residing at 3620 Wabash avenue, Kansas City, in the county of Jackson and State of Missouri, have invented certain new and useful Improvements in Hot-Cake Machines, of which the following is a specification, reference being had therein to the accompanying drawings.

This invention relates to hot cake machines and it has for its object to provide a batter container mounted in juxtaposition to a hot plate in such manner that the batter container may be moved to deposit charges of batter necessary for the individual cakes at any and all points upon the hot plate.

In my copending application Serial Number 406,307 filed on the 27th of August, 1920, I have disclosed a machine of this general character. The present invention differs from the construction shown in the aforesaid application in the valve mechanism employed and in the novel correlation of valve mechanism with the remainder of the structure whereby the handle of the container is brought into such relation with the handle of the valve mechanism that the operator may with one hand hold the container against bodily movement, while operating the valve mechanism with the other hand. In other words, the arrangement is such that the operator may grasp the handle of the container with the left hand and operate the valve mechanism with the right hand and with the left hand impart the necessary thrust to the container as a whole to resist the action of the valve handle if the movement of the latter should tend to move the container as a whole instead of moving the valve.

In the accompanying drawings:

Figure 1 is a side elevation of an apparatus constructed in accordance with the invention; and Fig. 2 is an enlarged sectional view through the valve mechanism.

Like numerals designate corresponding parts throughout both figures of the drawing.

Referring to the drawing the numeral 5 designates a bracket that is supported from a wall 6. This bracket comprises an angular bar 7 upon which a head 8 may be vertically adjusted. This head carries a tooth 9 adapted to engage with notched teeth 10 of the bracket 5. A sleeve 11 is mounted upon the head 8. One end of a lazy tongs bracket 12 is pivoted at 13 and slidably connected at 14 to the ear 15 of the sleeve 11. The opposite ends of this lazy tongs bracket is pivotally connected at 16 and slidably connected at 17 to an ear 18 of the batter container 19. This arrangement of parts is shown in my application above referred to and is shown here merely for the purposes of illustrating an operative construction. The batter container comprises a funnel like bottom 20 having an outlet spout 21 that is provided with seats 22 and 23 for slide valves 24 and 25. These valves are moved to alternately open and close the outlet 21, said valves being actuated by a lever 27 that is provided with an operating handle 26. Pivots 30 and 31 operable in slots 32 and 33 of lever 27 connect valves 24 and 25 to said lever. The lever is pivoted at 34 to a bracket 35 that projects laterally from the neck extension 21. The container 19 is provided with a handle 36 which lies vertically above and in substantial alinement with the handle 26. It is manifest that if the handle 26 be moved in and out, quickly, measured quantities of batter may be discharged from the neck extension 21 upon a hot plate 37 upon which the cakes may be baked.

Rotation of sleeve 11 upon head 8 permits the batter container 19 to be swung back and forth in a direction transverse to the lazy tongs bracket and the lazy tongs bracket permits the container to be moved back and forth in the opposite direction or toward and from the wall 6. Thus the container may be caused to deposit a charge of batter at any and every point upon the hot plate 37. It is manifest that in order to prevent the batter from running straight through, when the valves are in an intermediate position, a quick movement must be given to these valves, which means that the handle 26 must be thrust upon with considerable force. Unless means were provided to prevent it, this sudden thrust upon the handle 26 would tend to thrust the batter container 19 bodily inward as well as to operate the valve. By providing the handle 36 disposed in substantial alinement with the handle 26, the operator is enabled to resist the action of one hand with the other hand and to operate the valve quickly while at the same time accurately controlling the position of the batter container.

It is to be understood that the invention is not limited to the precise construction set forth but that it includes within its purview whatever changes fairly come within either the terms or the spirit of the appended claims.

Having described my invention, what I claim is:

1. In combination an extensible and retractable element, a batter container mounted at the outer end thereof, a hand grasp upon the batter container a pull upon which effects the extension of the extensible element and a push upon which effects the retraction of said element, a valve mechanism for controlling the discharge of batter from the container and an operating handle for said valve mechanism operable in the plane of movement of the extensible element during the extension and retraction thereof.

2. In combination a batter container, an extensible and retractable element upon which said batter container is mounted, a hand grasp upon the batter container at the side thereof opposite the extensible element and in alinement with said extensible element, a valve mechanism for controlling the discharge of batter from the container and a pivoted lever controlling said valve mechanism and swinging in the plane of movement of the extensible element during the extension and retraction thereof.

3. A structure as recited in claim 2 in combination with means for pivotally mounting the rear end of said extensible and retractable element to permit the said container to swing thereon in the arc of a circle.

In testimony whereof I hereunto affix my signature.

WILLIAM L. HEATHCOTE.